3,525,764
PRODUCTION OF HALOGENATED
PHENOXYSILANES
Hans-Joachim Kotzsch, Rheinfelden, and Roshdy Ismail, Spich, Germany, assignors to Dynamit Nobel Aktiengesellschaft, Troisdorf, Germany, a corporation of Germany
No Drawing. Filed Jan. 8, 1968, Ser. No. 696,141
Claims priority, application Germany, Jan. 7, 1967,
D 51,958
Int. Cl. C07f 7/06, 7/18
U.S. Cl. 260—448.8          8 Claims

ABSTRACT OF THE DISCLOSURE

Production of halogenated phenoxysilanes of the formula:

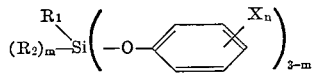

wherein $R_1$ is alkenyl, alkyl, cycloalkyl or aryl, $R_2$ is alkyl, cycloalkyl, aryl, alkoxy or aryloxy, X is fluorine, chorine or bromine, and $n$ is a whole number of from 1 to 5 and $m$ is 0 or 1; by condensing a halogenated phenol of the formula:

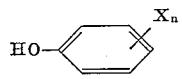

with a halogensilane of the formula:

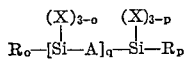

wherein R is hydrogen, alkyl, cycloalkyl, aryl, alkoxy, aryloxy or alkenyl, X is fluorine, chlorine or bromine, $o$ and $p$ each have a value of 0, 1 or 2, $q$ is equal to or greater than 1, and A is oxygen, alkylene, cycloalkylene, aralkylene or arylene which latter groups can contain ether or thioether groups, the halogen groups bonded to the silicon being exchanged for halogenated phenoxy groups, in the presence of tertiary amines or of their hydrochlorides, whose dihydrochlorides have an HCl tension at the reaction temperature, which is lower than the reaction pressure, the condensation being effected at a temperature of 40 to 150° C., and preferably of 55 to 100° C., possibly under use of a solvent.

---

The present invention relates to a process for the production of halogenated phenoxysilanes which are valuable as water repellants, sizing agents, fire retardants, fungicides, bactericides, insecticides, etc.

More particularly, this invention relates to a process for the production of halogenated phenoxysilanes of the formula:

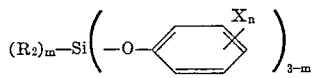

wherein $R_1$ represents alkenyl, alkyl, cycloalkyl or aryl, $R_2$ represents alkyl, cycloalkyl, aryl, alkoxy or aryloxy, X represents fluorine, chlorine or bromine, and $n$ is a whole number of from 1 to 5 and $m$ is 0 or 1.

Attempts have already been made to manufacture halogenated phenoxysilanes. One such procedure is the reaction of the corresponding sodium phenolates with halogen silanes in xylene and is described in J. Org. Chemistry 25, 1960, pp. 1645–1648. In this manner for the first time the phenoxysilanes of pentachlorophenol and of 2,4,6-trichlorophenol were obtained in yields of about 60%. The disadvantages of this process, in addition to the low yields obtained, is the unavoidable use of metallic sodium in order to obtain the sodium phenolates in the necessary high purity, and the production of large amounts of by-products, including inorganic salts. The latter considerably complicates the separation of the pure halogenated phenoxysilanes, particularly because of their poor solubility and their tendency to undergo hydrolysis. As a result, this process has not proved satisfactory for industrial production.

Other processes for the production of phenoxysilanes are known. For example, it is conventional to produce special phenoxysilanes from readily accessible esters, e.g., from ethoxysilanes, by way or re-esterification, in the presence, if desired, of acid or alkaline catalysts such as p-toluenesulfonic acid.

It has developed, however, that this process cannot be applied to the manufacture of organo-halogen phenoxysilanes of halogenated phenols. If, for example, an attempt is made to react such phenols with organo-organoxysilanes in the fused state or in solution, with or without a catalyst, it is observed that the condensation at first commences very slowly and finally comes to a halt before the desired phenoxysilanes have fully developed.

Another of the processes for the synthesis of phenoxysilanes which have been proposed is the direct condensation of halogensilane with phenol, in the presence of, or absence of, solvent, with the release of gaseous HCl. However, on attempting to react halogenated phenols by this process, it is again observed that the condensation again proceeds very slowly and is incomplete, coming to a stop before the desired phenoxysilanes have developed. This reaction can be carried out in the presence of excess or stoichiometric amounts of amines, the amines acting as HCl acceptors. Furthermore, a certain catalytic action is ascribed to the amines, which consists in their forming Lewis acid complex compounds with the halogen silane. However, even in the presence of excess or stoichiometric amounts of an amine, such as pyridine, halogenated phenols do not form phenoxysilanes in this reaction, but, due to theur unusually high acidity, they form ammonium salts which are then unsuitable for the formation of phenoxysilane.

In copending application Ser. No. 601,288, filed Dec. 7, 1966, a process is described for the manufacture of halogenated phenoxysilanes corresponding to Formula I wherein a halogensilane having the formula:

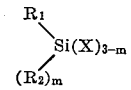

wherein $R_1$, $R_2$, X, $m$ and $n$ are as above defined is condensed with a halogenated phenol of the formula:

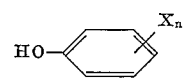

in the presence of tertiary amines or of their hydrochlorides, whose dihydrochlorides have an HCl tension at the reaction temperature, which is lower than the reaction pressure, the condensation being effected at a temperature of 40 to 150° C. and preferably of 55 to 100° C. possibly under use of a solvent.

The instant invention lies in the finding that the halogenated phenoxysilanes of Formula I can also be prepared by substituting for the halogensilanes

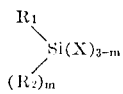

halogensilanes of the formula:

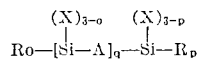

wherein R, $R_1$, $R_2$, X, A, $m$, $o$, $p$ and $q$ are each as above set out.

The reaction of the present invention is preferably carried out at normal pressure, although an excess pressure of up to 12 atmospheres can be used. The use of higher pressures however offers no important advantages over the pressureless procedure when effected in the presence of tertiary amines or their hydrochlorides, whose HCl tension is lower than 760 mm. Hg.

This reaction can be carried out both in the molten state and in the presence of solvents. Suitable solvents within the meaning of the present invention are both the aliphatic and aromatic hydrocarbons, as well as simple and cyclic ethers. Illustrative aliphatic hydrocarbons include both homogeneous compounds and mixtures of the same, as, for instance, iso-octane and gasoline fractions, such as, for example, those fractions having a boiling range of from 120 to 180° C. Benzene, toluene, and xylene are examples of aromatic hydrocarbons suitable for use as solvents. Instances of ethers which are suitable for use in the reaction include diisopropylether, diisoamylether, diphenylether, 1,4-dioxane, etc. From the above listing of suitable ethers, it can be seen that both aliphatic and aromatic open-chained ethers can be used.

Suitable starting products for use in carrying out the process of the invention are the halogenated phenols having the previously mentioned formula as above set out. There are included therein, for example, the fluorinated phenols such as 4-fluorophenol and pentafluorophenol, the chlorinated phenols such as 2-, 3- and 4-chlorophenol, 2,3-, 2,4-, 2,5-, 2,6-, 3,4-, and 3,5-dichlorophenol, 2,3,5-, 2,4,5- and 2,4,6-trichlorophenol, 2,3,4,6-tetrachlorophenol and pentachlorophenol, and the brominated phenols such as 2-, 3-, and 4-bromophenol, 2,4- and 2,6-dibromophenol, 2,4,6-tribromophenol and pentabromophenol. In addition, mixtures of the aforementioned halogenated phenols with one another and mixtures thereof with other hydroxy compounds (alcohol or halogen-free phenolic compounds) can be used in the manufacture of the phenoxysilanes according to the invention.

Halogen silanes suitable for use in the process of the invention include, for example, the following: hexachlorodisiloxane, dimethyltetrachlorodisiloxane, diphenyltetrachlorodisiloxane, divenyltetrachlorodisiloxane, 1,2-bis-trichlorosilylethane, 1,2-bis-trichlorosilylpropane, 1,2-bis-dichlorosilylethane, β-(methyl-dichlorodilyl)-ethyltrichlorosilane, 1,2-bis-methyl-dichlorosilylethane, poly-(dichloro)-silethylene, 1,2,4-tris-(trichlorosilylethyl)-cyclohexane, bis-(trichlorosilylethyl)-benzene and compounds as previously set out in which one or more of the chloro groups are substituted by alkoxy, such as, for example, n-, iso- or tert-butoxy, or by aryloxy such as nonylphenoxy or dimethylphenoxy.

In preparing the halogenated phenoxysilanes, the halogen silanes and halogenated phenols are employed, preferably in a stoichiometric ratio, i.e., 1 mol of halogenated phenol is used per mol of the halogen silane. The yields of halogenated phenoxysilanes obtained can be improved by the use of an excess of the phenolic compound.

Homogeneous and mixed tertiary amines containing aliphatic, cycloaliphatic and aromatic radicals or mixtures of such amines are suitable for use in carrying out the process according to the invention. The criterion for the suitability of a tertiary amine has been established as being the HCl tension of the dihydrochlorides at the reaction temperature, and, namely, that the HCl tension of the dihydrochloride must be lower than the reaction pressure. At normal pressure, therefore, those amines can be used whose HCl tension in the temperature range of the process is lower than 760 mm. Hg. At normal pressure, those amines are preferably used whose HCl partial pressure of 50 to 220° C. range from 80 to 700 mm. Hg, i.e., the dihydrochlorides of the tertiary amines that are usuable according to the invention must be thermally unstable in the reaction range.

Suitable tertiary amines having aliphatic radicals include, for example, trimethylamine, triethylamine, triisopropylamine, triisobutylamine, monoethyldiisopropylemine, monoethyl-di-n-butylamine, tri-n-butylamine, N,N,N',N'-tetramethylbutanediamine-(1,3), N,N,N',N'-tetramethylethylenediamine and having chlorine and cyano groups as substituents, such as, β-chloropropyldiisopropylamine, tris-(β-chloroethyl)-amine, N,N-di-n-butylaminoacetonitrile, N,N-diisopropylaminoacetonitrile, N-n-butyl-N-methylaminoacetonitrile, and the like. An example of the class of amines containing cycloaliphatic radicals is dimethylcyclohexylamine.

Still further suitable amines include those which have aromatic radicals, such as N,N-dialkylaniline, N,N-dimethylaniline and N,N-diethylaniline and others, p-bromophenyldimethylamine, 2,4 - dinitrophenyldimethylamine, benzyldimethylamine, p-nitrophenol-di-n-butylamine, 2,4-dichlorophenyldiethylamine and N,N,N',N' - tetramethylbenzidine. The aliphatic aromatic amines are especially suited for carrying out the instant process under normal pressure. Also suitable for heterocyclic amines, such as N-n-butylmorpholine, N-phenylmorpholine, N-(4-methylphenyl)-morpholine, morpholinacetic acid morpholide, N,N-dialkyl and N,N-diarylpiperazines, di-n-butylpiperazine, N,N-diphenylpiperazine, N-alkyl and N-arylquinolines, N-n-propyltetrahydroquinoline, N-phenyltetrahydroquinoline, N-alkyl and N-aryl-n-pyrrolidines, N-methylpyrrolidine, N-n-butylpyrrolidine, N-phenylpyrrolidine and the like.

In addition tertiary amines containing nitrile groups have proven especially well suited for use in carrying out the reaction, i.e., tertiary amines the amino group of which is not a component of an aromatic ring system, such as N,N-di-(n-butyl)-aminoacetonitrile, N,N-di-(isopropyl)-aminoacetonitrile, N - (n - butyl) - N - (methyl)-aminoacetonitrile, and the like.

The special advantage of the process according to the invention is to be seen in the fact that the reaction continues until all of the halogen has been replaced by the halogenated phenols, and does not stop at certain stages of reaction, as has been the case in the processes previously known.

The silanes produced by the process of the invention can be used as water-repellent agents, parting agents, dressings for glass fiber fabrics, and for surface improving agents because of their fire retarding, fungicidal phytotoxic, bactericidal and to some extent insecticidal properties.

The following samples are given for the purpose of illustrating the invention and are in nowise to be construed in limitation thereof.

EXAMPLE 1

0.6 mol pentachlorophenol was dissolved in one liter hot xylene and the solution then dried by distillation. The solution was introduced into a 2-liter flask equipped with stirrer, reflux condenser and dropping funnel and 0.5 ml. of N,N-dimethylaniline was then added to this solution. Thereafter, a solution of 0.1 mol of 1,2-bis-(trichlorosilyl)-ethane in xylene was added thereto in dropwise fashion with refluxing. After 4 hours of boiling the product began to precipitate in crystalline form under intense evolution of HCl. After further boiling overnight, the crystalline precipitate comprising 154 grams 1,1,1,4,4,4-hexakis-(pentachlorophenoxy) - 1,4 - disilabutane was suction filtered while hot and washed with benzene. Following recrystallization from o-dichlorobenzene, the product melted at 338° C.

*Analysis.*—Calculated for $C_{38}H_4Cl_{30}O_6Si_2$ (percent): C. 27.16; H, 0.30; Cl, 63.44; Si, 3.42. Found (percent): C, 26.89; H, 0.31; Cl, 63.18; Si, 3.63.

EXAMPLE 2

0.6 mol 2,4,6-tribromophenol was reacted according to the procedure described in Example 1 with 0.1 mol 1,2-bis-trichlorosilylethane in 1 liter toluene for 18 hours. After concentration to 400 ml., 200 ml. of freshly distilled pentane was added thereto. 126 grams of crystalline 1,1,1,4,4,4 - hexakis - (2,4,6-tribromophenoxy)-1,4-disilabutane were thusly obtained. The product as recrystallized from benzene melted at 257 to 258° C.

*Analysis.*—Calculated for $C_{38}H_{16}Br_{18}O_6Si_2$ (percent): C, 22.06; H, 0.78; Br, 69.58; Si, 2.72. Found (percent): C, 22.40; H, 1.02; Br, 69.10; Si, 3.01.

EXAMPLE 3

0.4 mol pentachlorophenol was dissolved in 500 ml. toluene and dried by distillation. This solution was then placed in a one-liter flask equipped with stirrer and reflux condenser, and 0.5 ml. N,N-dimethylaniline and 0.1 mol 1,2-bis-(tert. butoxydichlorosilyl)-ethane added thereto. The resulting mixture was boiled for 24 hours with refluxing, 0.4 mol of HCl being thereby split off. The thusly produced product was concentrated to 150 ml. cyclohexane was added, and crystallization took place. Recrystallization of the raw product from benzene yielded 76 grams of 1,4-di-tert.-butoxy-1,1,4,4 - tetrakis - (pentachlorophenoxy)-1,4-disilabutane having a melting point of 202 to 204° C.

*Analysis.*—Calculated for $C_{34}H_{20}Cl_{20}O_6Si_2$ (percent): C, 31.65; H, 1.54; Cl, 55.00; Si, 4.34. Found (percent): C, 32.02; H, 1.76; Cl, 54.65; Si, 4.71.

EXAMPLE 4

0.3 mol nonylphenol was boiled in 500 ml. toluene with 0.5 ml. dimethylaniline and 0.1 mol 1,2-bis-trichlorosilylethane for 4 hours with stirring and refluxing, 0.3 mol of gaseous HCl being thereby released. Then 0.3 mol pentachlorophenol was added and the batch was reacted for another 16 hours until the evolution of HCl had ceased. The resulting mixture was concentrated in vacuo, the oily residue was dissolved in pentane, and the solution was brought to a boil with some activated charcoal, after which it was filtered and concentrated by evaporation. 135 grams 1,1,1,4,4,4 - tris - (nonylphenoxy) - tris-(pentachlorophenoxy) 1,4-disilabutane was obtained as the concentrate, in the form of an oil that hardened to a waxy consistency.

*Analysis.*—Calculated for $C_{65}H_{73}Cl_{15}O_6Si_2$ (percent): C, 50.70; H, 4.74; Cl, 34.66; Si, 3.64. Found (percent): C, 51.04; H, 4.98; Cl, 34.24; Si, 3.91.

EXAMPLE 5

(a) Preparation of the starting material

β-(Methyldichlorosilyl) - ethyltrichlorosilane was produced by the reaction of methyldichlorosilane with an equivalent quantity of vinyltrichlorosilane under refluxing in the presence of a platinum-aluminum oxide catalyst. Yield: 96% $BP_{12}$, 75 to 78° C. (M.P.: 12° C.).

*Analysis.*—Calculated for $C_3H_7Cl_5Si_2$ (percent): C, 13.0; H, 2.5; Si, 20.2; Cl, 64.2. Found (percent): C, 13.0; H, 2.5; Si, 20.0; Cl, 64.0.

(b) The reaction according to the invention 0.5 mol pentachlorophenol was dissolved in one liter of hot benzene and dried by distillation. Analogously to Example 1, the solution was then reacted with 0.1 mol of β-(methyldichlorosilyl)-ethyltrichlorosilane under 16 hours of boiling. The product did not immediately precipitate, but had to be isolated first by concentrating to 400 ml. and adding a small amount of cyclohexane. 109 grams of 1,1,1,4,4-pentakis-(pentachlorophenoxy)-1,4-disilapentane were thereby obtained. After recrystallization from benzene the product had a melting point of 238° C.

*Analysis.*—Calculated for $C_{33}H_7Cl_{25}O_5Si_2$ (percent): C, 26.94; H, 0.5; Cl. 62.00; Si, 3.96. Found (percent): C, 27.42; H, 0.72; Cl, 61.67; Si, 4.00.

EXAMPLE 6

0.11 mol pentachlorophenol was reacted by a procedure analogous to that of Example 1, with 0.05 mol poly-(dichloro)-silethylene (chlorine content 57.6%) to form 16 g. poly-(bis-pentachlorophenoxy)-silethylene having a melting point of 302 to 304° C. Elemental analysis showed a chlorine content of 64.5% and a silicon content of 5.2%. The values calculated for $(C_{14}H_4Cl_{10}O_2Si)_n$ had been 63.2% and 5.0%, respectively.

The poly-(dichloro)-silethylene used was prepared according to a known method by the reaction in toluene of equimolar amounts of dichlorosilane with acetylene at 140° C. under pressure in the presence of 5 wt. percent of a platinum-containing aluminum oxide.

EXAMPLE 7

0.3 mol pentachlorophenol and 0.05 mol bis-(trichlorosilylethyl)-benzene were reacted according to the procedure described in Example 1 to form 81 grams of hexakis-pentachlorophenyl ester which had a melting point of 362° C.

*Analysis.*—Calculated for $C_{46}H_{12}Cl_{30}O_6Si_2$ (percent): C, 31.00; H, 0.67; Cl, 59.8; Si, 3.14. Found (percent): C, 30.65; H, 0.90; Cl, 60.04; Si, 3.40.

EXAMPLE 8

(a) Preparation of the starting material 1,2,4-tris-(trichlorosilyl)-cyclohexane was prepared by the reaction of 1,2,4-trivinylcyclohexane with an equivalent amount of trichlorosilane, under refluxing, in the presence of a platinum-aluminum oxide catalyst. Yield: 78% $BP_2$: 175–178° C.

*Analysis.*—Calculated for $C_{12}H_{21}Cl_9Si_3$ (percent): C, 25.38; H, 3.72; Cl, 56.21; Si, 14.80. Found (percent): C, 25.37; H, 3.64; Cl, 56.60; Si, 14.61.

(b) The reaction according to the invention 0.45 mol pentachlorophenol and 0.5 mol 1,2,4-tris-(trichlorosilylethyl)-cyclohexane were reacted in accordance to the method described in Example 1. The nonakis-pentachlorophenyl ester thereby formed was isolated by concentration in vacuo and crystallization from cyclohexane in a 74% yield, and had a melting point of 146–148° C.

*Analysis.*—Calculated for $C_{66}H_{21}Cl_{45}O_9Si_3$ (percent): Cl 60.42; Si, 3.18. Found (percent): Cl, 60.40; Si, 3.22.

EXAMPLE 9

0.6 mol pentachlorophenol was dissolved in 500 ml. hot toluene and dried by distillation. Thereafter 0.5 ml. N,N-di-n-butylaminoacetonitrile was added to the solution and thereafter within 20 minutes 0.1 mol of hexachlorodisiloxane was added dropwise, to the then boiling solution. The evolution of HCl began, and after 5 hours the product commenced to precipitate. Following further boiling overnight, the finely crystalline hexakispentachlorophenoxy silane was suction filtered while still hot and washed with toluene. The yield amounted to 94%, and the melting point was 327–328° C.

*Analysis.*—Calculated for $C_{36}Cl_{30}O_7Si_2$ (percent): C, 25.90; Cl, 64.00; Si, 3.36. Found (percent): C, 25.68; Cl, 63.55; Si, 3.52.

We claim:
1. A process for the preparation of a halogenated phenoxysilane of the formula:

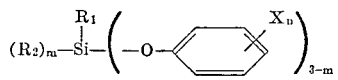

wherein $R_1$ represents a member selected from the group consisting of alkenyl, alkyl, cycloalkyl and aryl, $R_2$ represents a member selected from the group consisting of alkyl, cycloalkyl, aryl, alkoxy and aryloxy, X represents a member selected from the group consisting of fluorine, chloride and bromine, $n$ is a whole number of from 1 to 5, and $m$ represents a number of from 0 to 1, which comprises condensing at a temperature of from 40 to 150° C. a halogenated phenol of the formula:

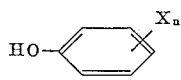

with a halogen silane of the formula:

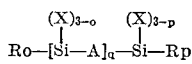

wherein R is a member selected from the group consisting of hydrogen, cycloalkyl, aryl, alkoxy and aryloxy, X is a member selected from the group consisting of fluorine, chlorine, and bromine, $o$ and $p$ each have a value of 0, 1 or 2, $q$ has a value equal to or greater than 1, A is a member selected from the group consisting of oxygen, alkylene, cycloalkylene, aralkylene or arylene and such groups containing a member selected from the group consisting of ether and thioether groups in the presence of a member selected from the group consisting of tertiary amines and hydrochlorides thereof, the dihydrochlorides of which have at the reaction temperature an HCl tension which is lower than the reaction pressure as catalyst.

2. Process according to claim 1 which comprises effecting said condensation at a temperature of from 55 to 100° C.

3. Process according to claim 1 which comprises effecting said condensation in the presence of a solvent.

4. Process according to claim 1 which comprises utilizing said catalyst in an amount of from 0.1 to 20 molpercent referred to said halogen silane.

5. Process according to claim 1 which comprises utilizing said catalyst in an amount of from 0.1 to 2 molpercent referred to said halogen silane.

6. Process according to claim 1 wherein said tertiary amine is a nitrile group containing amine.

7. Process according to claim 1 which comprises effecting said condensation using said halogen silane and halogenated phenol in a stoichiometric ratio.

8. Process according to claim 1 which comprises effecting said condensation using an excess of phenolic compound.

References Cited

Speier: J.A.C.S., 74, February 20, 1952, pp. 1003–1010.
George et al.: J. Org. Chem., 25, September 1960, pp. 1645–1648.

TOBIAS E. LEVOW, Primary Examiner

P. F. SHAVER, Assistant Examiner

U.S. Cl. X.R.

106—13, 15; 252—8.1